United States Patent
Lin

(10) Patent No.: US 8,881,368 B2
(45) Date of Patent: Nov. 11, 2014

(54) PUNCH DOWN TOOL WITH A REPLACEABLE PUNCH DOWN BLOCK

(75) Inventor: Yen-Lin Lin, New Taipei (TW)

(73) Assignee: JYH ENG Technology Co., Ltd., New Taipei (TW)

( * ) Notice: Subject to any disclaimer, the term of this patent is extended or adjusted under 35 U.S.C. 154(b) by 554 days.

(21) Appl. No.: 13/298,419

(22) Filed: Nov. 17, 2011

(65) Prior Publication Data

US 2013/0125381 A1    May 23, 2013

(51) Int. Cl.
| | |
|---|---|
| *B23P 19/04* | (2006.01) |
| *H01R 43/042* | (2006.01) |
| *H01R 43/22* | (2006.01) |
| *H02G 1/14* | (2006.01) |
| *H01R 43/01* | (2006.01) |

(52) U.S. Cl.
CPC ............. *H01R 43/0421* (2013.01); *H02G 1/14* (2013.01); *H01R 43/015* (2013.01); *H01R 43/0425* (2013.01)
USPC ............................. 29/566.4; 29/33 M; 29/750

(58) Field of Classification Search
CPC ................................................ H01R 43/0421
USPC ........... 29/566.4, 33 M, 750–752, 758; 7/107
See application file for complete search history.

(56) References Cited

U.S. PATENT DOCUMENTS

| | | | |
|---|---|---|---|
| 5,832,603 A | 11/1998 | Fallandy | |
| 7,073,245 B2 | 7/2006 | Fallandy | |
| 7,444,744 B2 | 11/2008 | Caveney et al. | |
| 2005/0251991 A1* | 11/2005 | Alexander et al. | 29/566.4 |
| 2010/0064502 A1* | 3/2010 | Chen | 29/566.4 |
| 2010/0064503 A1* | 3/2010 | Chen | 29/566.4 |
| 2010/0071202 A1* | 3/2010 | Peng et al. | 29/751 |

* cited by examiner

*Primary Examiner* — Erica E Cadugan
(74) *Attorney, Agent, or Firm* — Guice Patents PLLC

(57) ABSTRACT

A punch down tool includes a handle unit including pivoted grip and trigger, and a replaceable punch down block, which includes a carrier detachably attached to the top end of the grip, a cutter block detachably fastened to the top end of the grip to secure the carrier to the grip and holding a set of punch-down elements and a pair of cutter blades and a slide block slidably coupled to the carrier to carry a jack and a network cable for processing and forcible by the trigger against the cutter block to have the core wires of the network cable to be punched into the jack by the punch-down elements and cut off by the cutter blades.

6 Claims, 7 Drawing Sheets

PUNCH DOWN TOOL WITH A REPLACEABLE PUNCH DOWN BLOCK

BACKGROUND OF THE INVENTION

1. Field of the Invention

The present invention relates to a punch down tool for punching the core wires of a network cable into a jack and cutting off the unnecessary parts of the core wires and more particularly, to such a punch down tool, which allows replacement of the punch down block to fit different jacks having different specifications.

2. Description of the Related Art

A conventional jack 200, as shown in FIG. 5, generally comprises a rectangular body 201. The rectangular body 201 comprises two sets of protruding blocks 202 protruded from the front wall thereof and arranged at two sides relative to a cable groove 203 on the middle of the front wall, and a wire groove 204 defined between each of adjacent protruding blocks 202 of each set of protruding blocks 202. A network cable 300 is set in the cable groove 203, and the core wires 301 of the network cable 300 are respectively inserted into the wire grooves 204 and punched down into contact with respective insulation displacement contacts (not shown) in the body 201 electrically.

Conventionally, a punch down tool having punch-down elements 400 is used for forcing the core wires 301 into the respective wire grooves 204 and cutting off the parts of the core wires 301 that extend out of the protruding blocks 202, as shown in FIG. 6.

Similar punch down tools are known as follows:

U.S. Pat. No. 7,444,744 discloses a punch down tool, entitled "Tool for connector assembly", which includes a main tool body having an electrical connector assembly holder. The holder includes first and second cavities. The first cavity includes spaced anvils and removably retains an electrical connector end cap between the anvils. A cutting ram is opposed to the first cavity and includes two cutting blades that are translatable between disengaged and engaged positions to trim and sever excess wire lengths from the electrical connector end cap. The second cavity removably retains the electrical connector end cap and a jack housing. A termination ram is opposed to the second cavity and movably mounted between disengaged and engaged positions to terminate the jack housing with the end cap. A trigger mechanism is operably connected to both the cutting ram and the termination ram.

U.S. Pat. No. 5,832,603 discloses a punch down tool, entitled "Method and wire termination tool for retaining wire in receptacle" which includes a pistol handle having a trigger which is operative to bring an actuator into engagement with a wire-insertion and cutting head carrier. The cutting head carrier retains a multiple wire-insertion and cutting head having a plurality of unitary wire-insertion and cutting blades, and is linearly translatable along an axis of the handle towards a nose end of the tool. The carrier cavity is sized such that the cutting head blades protrude from beyond the carrier, so that they may readily engage the reduced capacity wire termination receptacle retained in a wire termination receptacle holder installed at the nose end of the tool handle. As the operator grips the handle and squeezes the trigger, the carrier will be linearly pushed along the handle axis toward the wire termination receptacle holder, so as to precisely bring the wire termination receptacle and the wire-insertion and cutting head into engagement with one another, and cause the unitary structure-configured blades of the cutting head to seat and cut wires in the wire termination receptacle.

In the aforesaid two prior art designs, the electrical connector assembly holder or cutting head carrier is a fixed type, not replaceable. For processing a different jack having a different specification, for example, a jack configured to receive core wires of a network cable in a different direction, a different design of electrical connector assembly holder or cutting head carrier must be used. Thus, a user may have to prepare different punch down tools or wire termination tools to fit different application requirements, increasing the cost and reducing product competitiveness.

To improve the aforesaid problems, U.S. Pat. No. 7,073,245 discloses a punch down tool, entitled "Multiple-wire termination tool with translatable jack and cutting blade precision alignment carrier", which provides a support housing for a linearly translatable, and removable carrier.

However, due to structural limitations, replacement of the carrier is complicated and inconvenient. A further improvement is desired.

SUMMARY OF THE INVENTION

The present invention has been accomplished under the circumstances in view. It is main object of the present invention to provide a punch down tool, which allows replacement of the punch down block to fit different jacks having different specifications.

To achieve this and other objects of the present invention, a punch down tool comprises a handle unit and a punch down block. The handle unit comprises a grip and a trigger. The grip comprises hooks extended from the top end thereof. The trigger is pivotally connected to the grip, comprising a pressure face and a slide shaft disposed at the top end thereof. The punch down block is detachably mounted at the top end of the handle unit, comprising a carrier, a cutter block and a slide block. The carrier is detachably attached to the top end of the grip, comprising an opening located on the bottom wall and extended to one end and a pair of slide rails bilaterally disposed above the opening. The cutter block is mounted in the carrier and detachably fastened to the hook means of the grip to secure the carrier to the grip. The cutter block comprises a plurality of punch-down elements and two cutter blades. The slide block is coupled to the slide rails of the carrier and movable along the slide rail relative to the cutter block, comprising opposing front and rear ends and a receptacle defined in the front end and adapted for holding a jack. The rear end of the slide block is coupled to the pressure face and slide shaft of the trigger in such a manner that biasing the trigger relative to the grip causes movement of the slide block toward the cutter block, enabling core wires of a network cable to be punched into a jack in the receptacle by the punch-down elements and cut off by the cutter blades.

The punch down block of the punch down tool can be directly detached from the handle unit for a replacement to fit a different jack having a different specification. This structural design is simple, facilitating quick replacement of the punch down block. Thus, a series of punch down blocks can be selectively used with the handle unit to join different jacks and network cables. Thus, a user needs not to prepare different punch down tools for processing different jacks and network cables, saving the cost.

DETAILED DESCRIPTION OF THE PREFERRED EMBODIMENT

Figure 1:
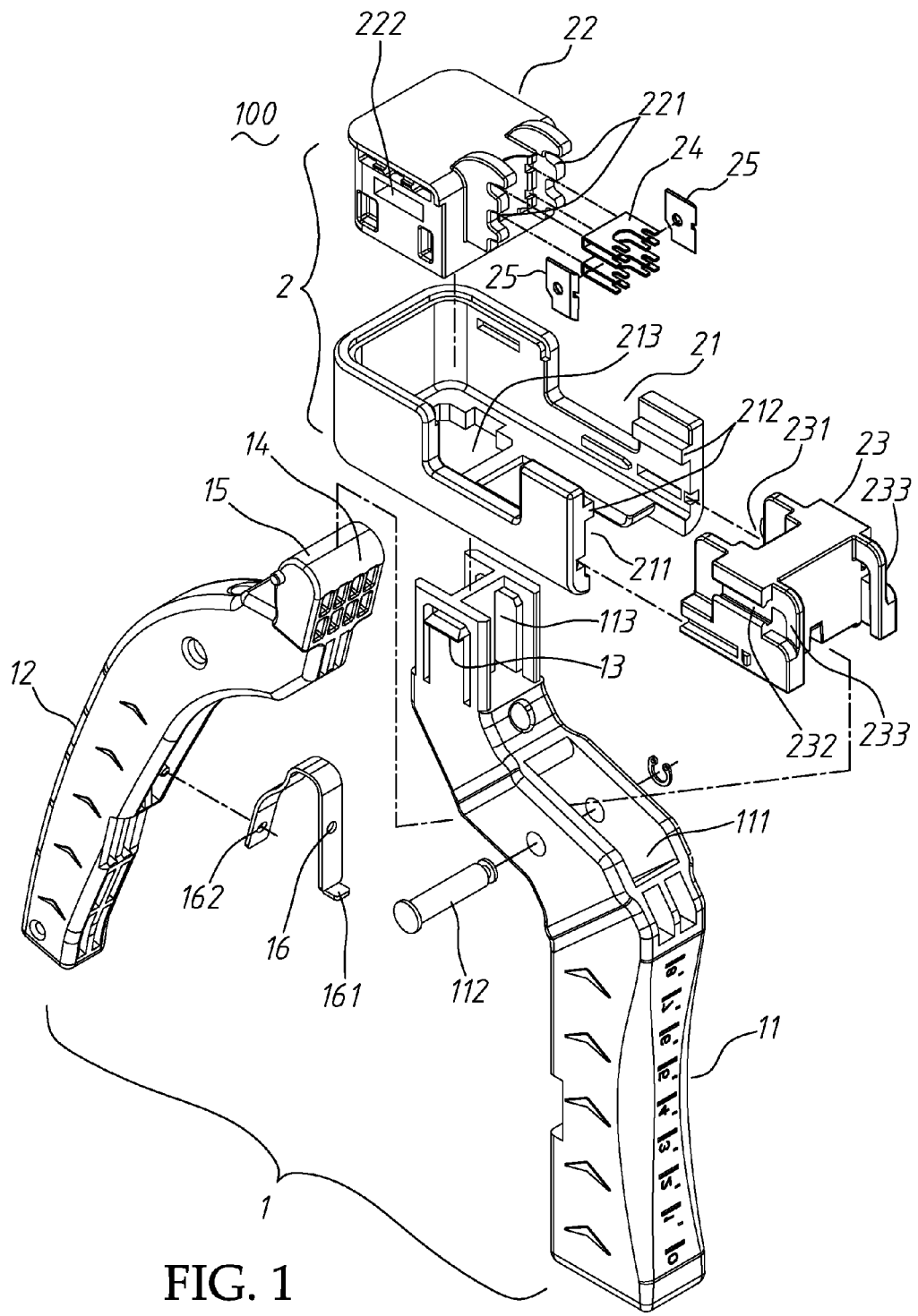
FIG. 1 is an exploded view of a punch down tool in accordance with the present invention.
Figure 2:
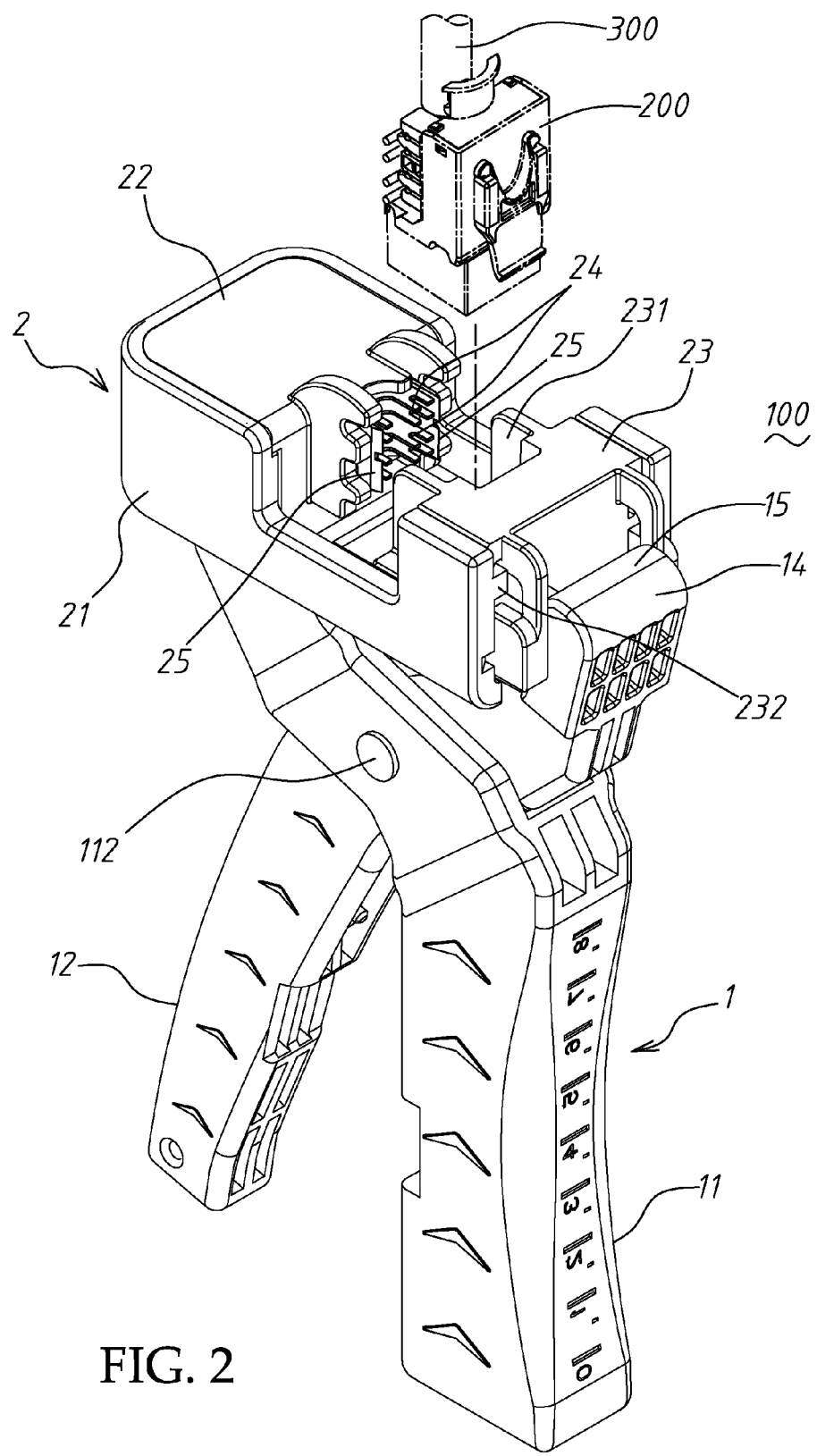
FIG. 2 is an elevational assembly view of the punch down tool in accordance with the present invention.
Figure 3:
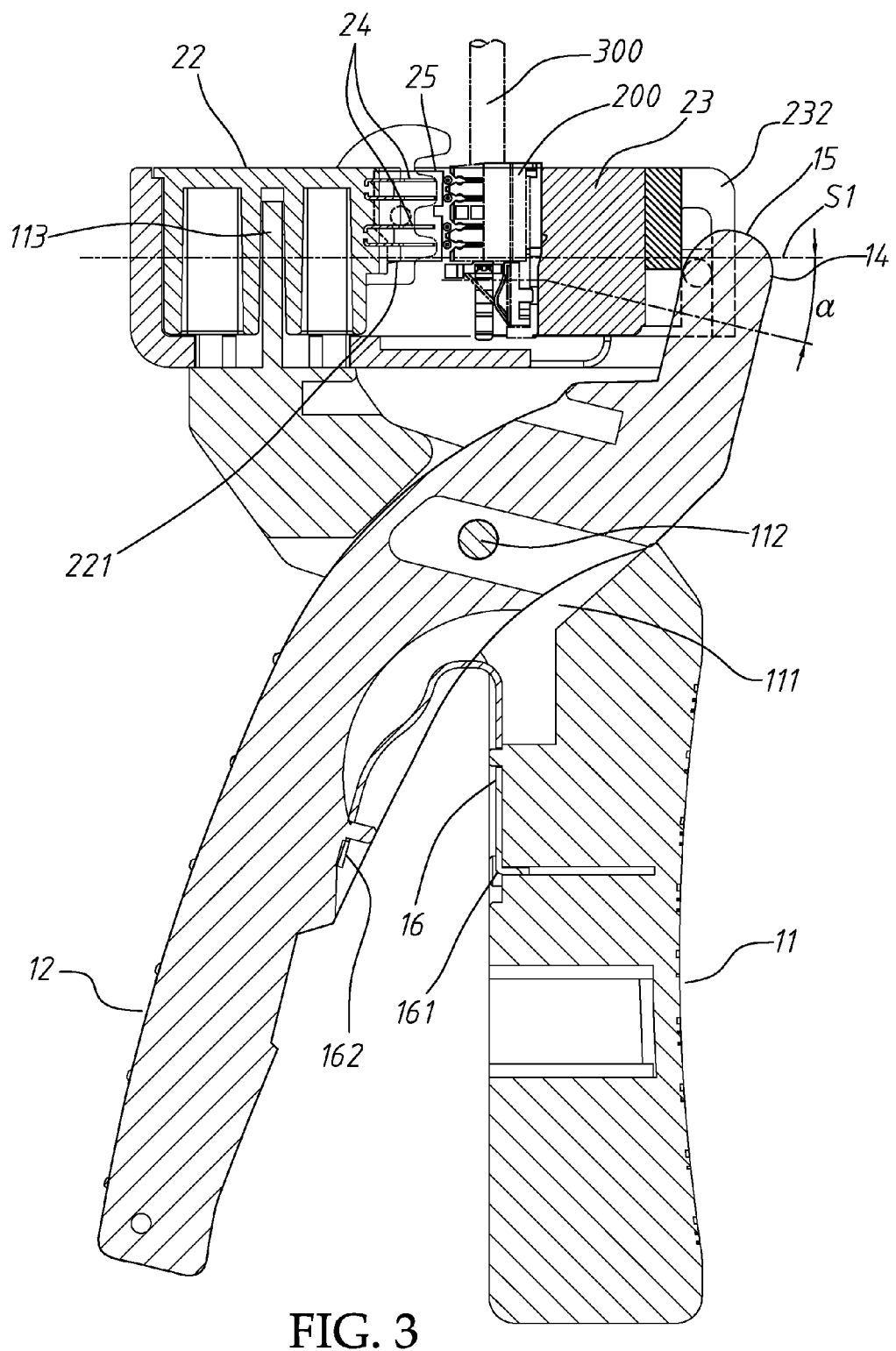
FIG. 3 is a sectional view of the punch down tool in accordance with the present invention.

Referring to FIGS. 1~3, a punch down tool 100 in accordance with the present invention generally is shown. The punch down tool 100 comprises a handle unit 1, and a punch down block 2.

The handle unit 1 comprises a grip 11 and a trigger 12. The grip 11 comprises two hooks 13 respectively extended from opposing front and back sides of the top end 113 thereof. The trigger 12 is pivotally connected to the grip 11, comprising a pressure face 14 and a slide shaft 15 disposed at the top end thereof.

Figure 4:
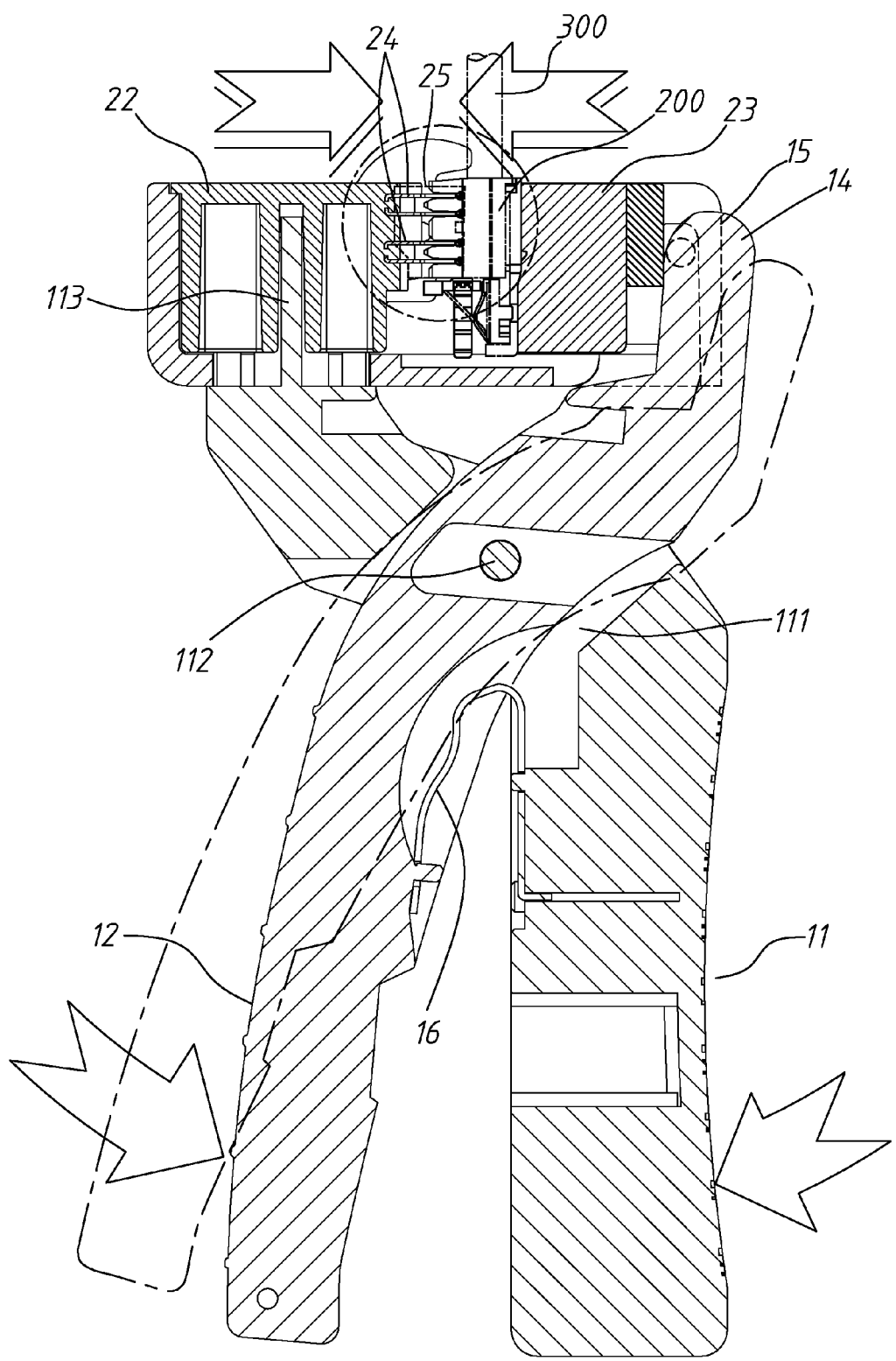
FIG. 4 is a schematic drawing of the present invention, illustrating a punch down operation of the punch down tool.
Figure 5:
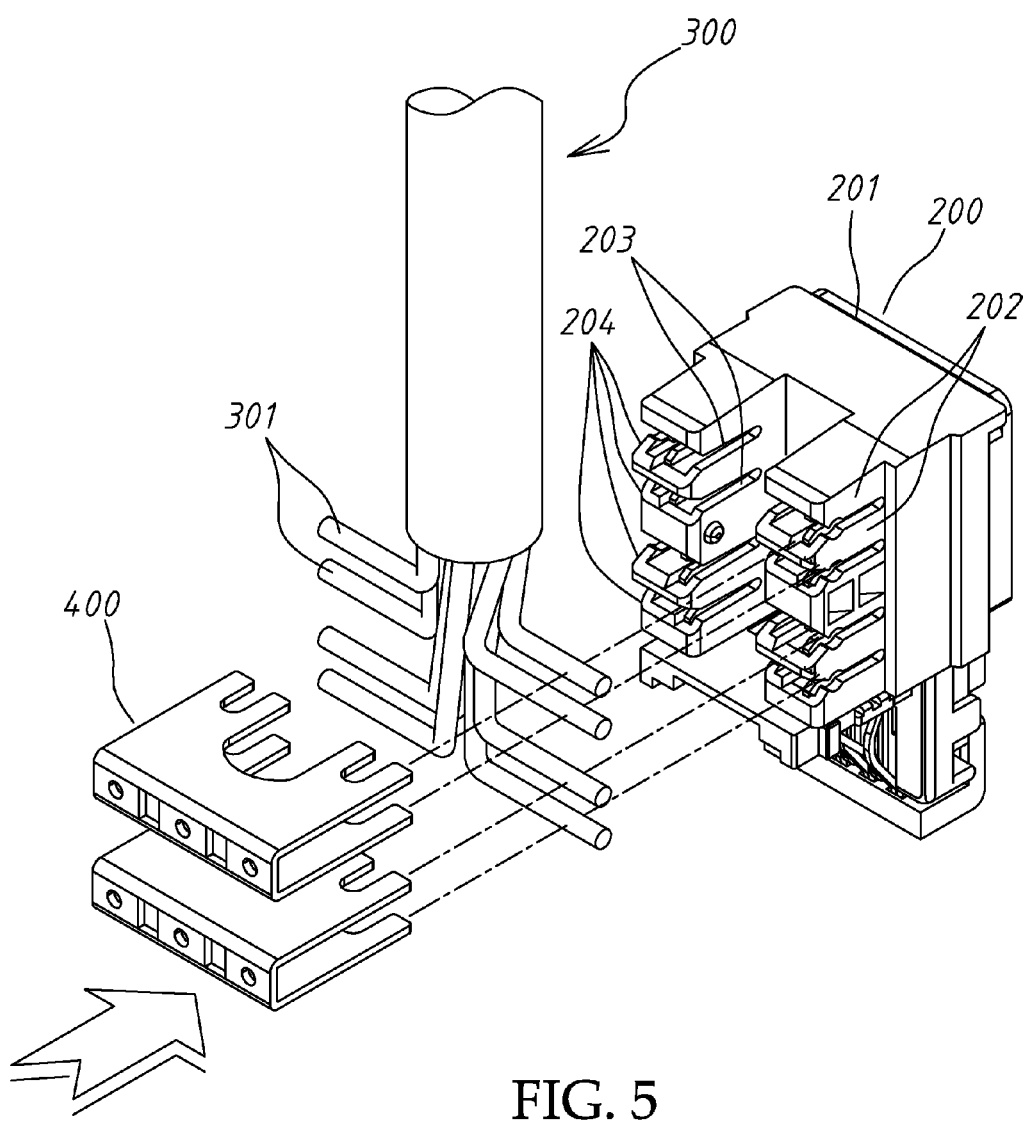
FIG. 5 is an exploded view of a jack, a network cable and punch-down elements according to the prior art.
Figure 6:
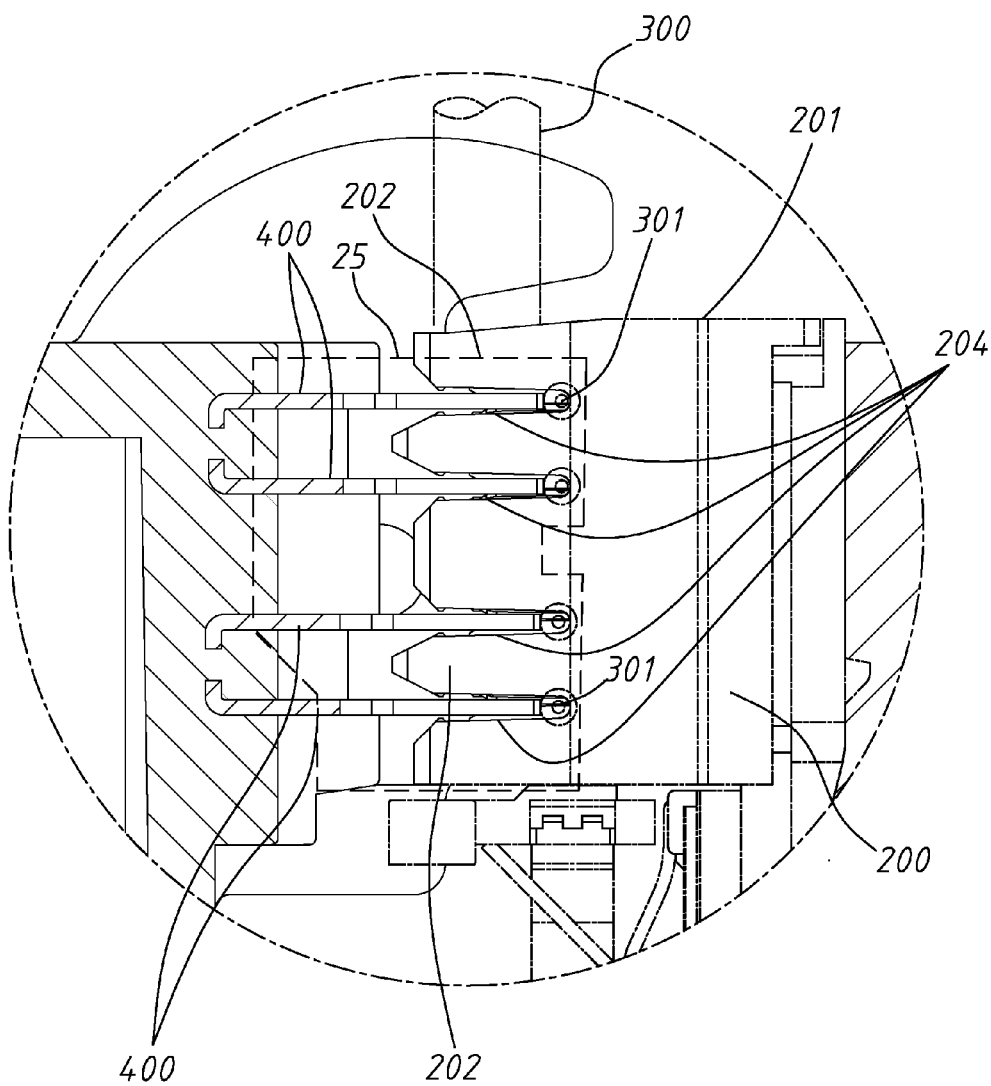
FIG. 6 is a plain view in an enlarged scale, illustrating the punch-down elements forced the core wires of the network cable into the jack according to the prior art.

Further, the grip 11 defines an opening 111 for the passing of the trigger 12. The trigger 12 is inserted through the opening 111 of the grip 11, and pivotally connected to the trip 12 with a pivot 112. Further, a substantially arched spring plate 16 is set between the grip 11 and the trigger 12. The arched spring plate 16 has a first end 161 affixed to the grip 11, and a second end 162 affixed to the trigger 12. Thus, as shown in FIG. 4, applying a pressure to the bottom end of the trigger 12 toward the grip 11 causes the arched spring 16 to be compressed and the pressure face 14 and slide shaft 15 of the trigger 12 to be moved toward the hooks 13 of the handle 11. When the applied force disappears, the arched spring plate 16 immediately returns the trigger 12 to its former position (see the position shown in FIG. 3 or the position indicated by the imaginary line in FIG. 4).

The punch down block 2 comprises a carrier 21, a cutter block 22 and a slide block 23, and is arranged at the top end of the handle 1.

The carrier 21 comprises a crossed slot 213 located on the bottom wall thereof and attached to the top end 113 of the grip 11, an opening 211 disposed adjacent to one side of the crossed slot and extending to one end of the carrier 21, and a pair of slide rails 212 symmetrically disposed above the opening 211.

The cutter block 22 comprises a holder structure 221 located on one side thereof, a plurality of punch-down elements 24 mounted in the holder structure 221 at different elevations, two cutter blades 25 mounted in the holder structure 221 at two opposite lateral sides relative to the punch-down elements 24, and two hook holes 222 respectively and symmetrically located on two opposite lateral sidewalls thereof. After insertion of the cutter block 22 into the carrier 21, the top end 113 of the grip 11 is inserted through the crossed slot 213 of the carrier 21 into the cutter block 22 to force the hooks 13 into engagement with the hook holes 222 of the cutter block 22. Thus, the cutter block 22, the carrier 21 and the grip 11 are fastened together.

The slide block 23 is configured to fit the opening 211 and slide rails 212 of the carrier 21. The slide block 23 comprises two sliding grooves 232 respectively located on the two opposite lateral sidewalls thereof and respectively coupled to the sliding rails 212. Thus, the slide block 23 can be moved back and forth linearly relative to the carrier 21. As shown in FIG. 3, the punch down block 2 defines a horizontal axis S1. In this embodiment, the sliding rails 212 are arranged in a parallel manner relative to the horizontal axis S1. Alternatively, the sliding rails 212 can be so arranged that a contained angle α is defined between the horizontal axis S1 and the sliding rails 212.

The slide block 23 is movable to abut against the cutter block 22, comprising a receptacle 231 defined in one end thereof and adapted for receiving a jack 200, a pair of lugs 233 located on the other end thereof coupled to the pressure face 14 and slide shaft 15 of the trigger 12. Thus, biasing the trigger 12 can push the slide block 23 to force the jack 200 toward the punch-down elements 24 and cutter blades 25 at the cutter block 22, causing the core wires 301 of the network cable 300 to be punched into the jack 200 by the punch-down elements 24 and the unnecessary parts of the core wires 301 to be cut off by the cutter blades 25.

Please compare FIG. 3 to FIG. 4. In FIG. 3, the jack 200 and the network cable 300 are arranged together and set in the receptacle 231 of the slide block 23. At this time, the trigger 12 is not biased; the slide block 23 is kept away from the punch-down elements 24 and cutter blades 25 of the cutter block 22.

As shown in FIG. 4, when applying a pressure to the trigger 12 to turn the trigger 12 about the pivot 112, the pressure face 14 and slide shaft 15 of the trigger 12 will force the slide block 23 toward the punch-down elements 24 and cutter blades 25 of the cutter block 22, causing the core wires 301 of the network cable 300 to be punched into the jack 200 by the punch-down elements 24 and the unnecessary parts of the core wires 301 to be cut off by the cutter blades 25. Thereafter, remove the network cable 300 and the jack 200 from the punch down tool 100. If the slide rails 212 adopt a slanting design, according to principle of moments, cutting the unnecessary parts of the core wires 301 will save much effort.

Obviously, the punch down block 2 of the punch down tool 100 can be directly detached from the handle unit 1 for a replacement to fit a different jack 200 having a different specification. This structural design is simple, facilitating quick replacement of the punch down block 2. Thus, a series of punch down blocks 2 can be selectively used with the handle unit 1 to join different jacks 200 and network cables 300. Thus, a user needs not to prepare different punch down tools for processing different jacks and network cables, saving the cost.

Figure 7:
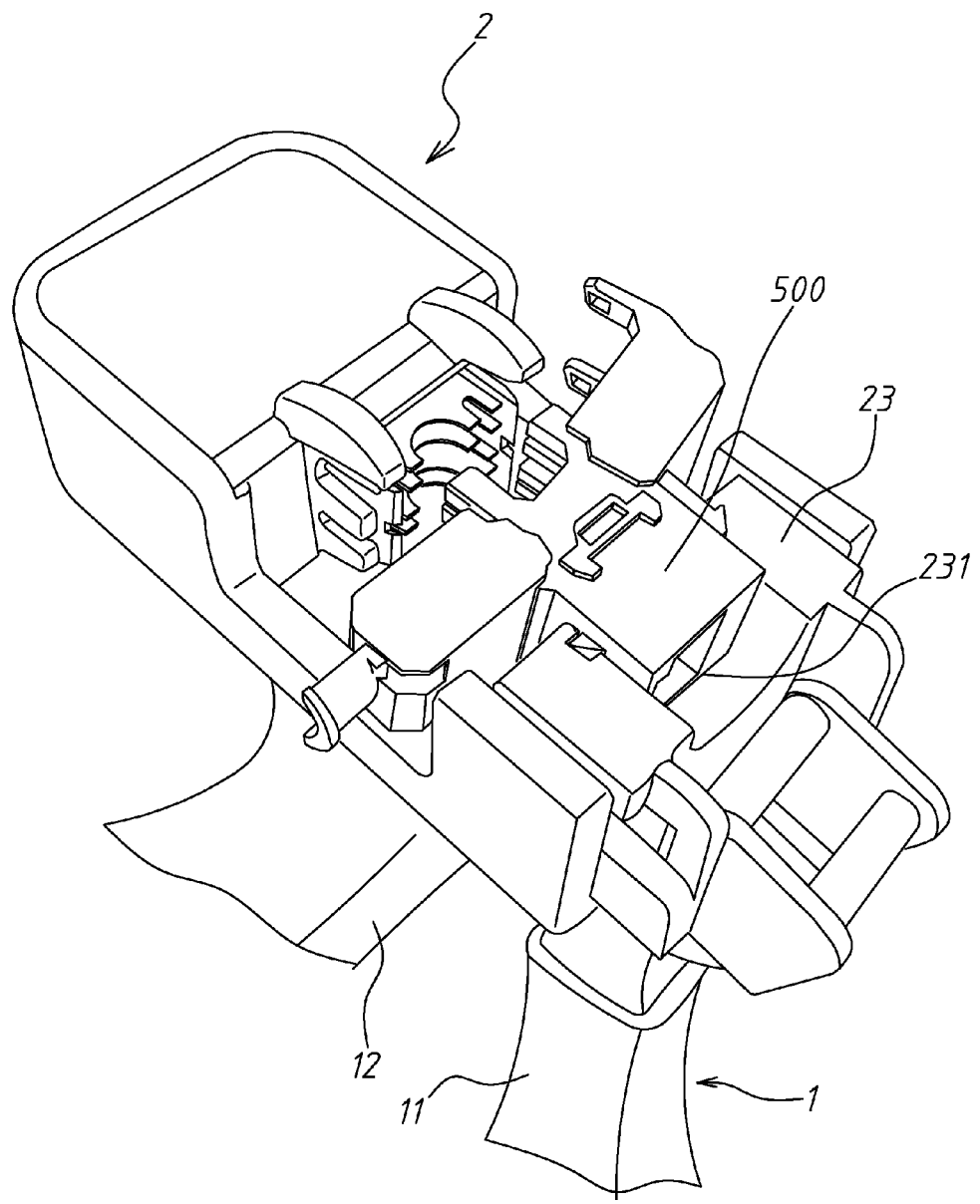
FIG. 7 is an oblique top elevation of the present invention, illustrating the extending direction of the plug hole of the loaded jack in a parallel manner relative to the feeding direction of the network cable.

In the aforesaid example, the plug hole of the jack 200 extends perpendicular to wire-feeding direction of the network cable 300. In the example shown in FIG. 7, the jack 500 is set in the receptacle 231 of the slide block 23, wherein the plug hole of the jack 500 extends perpendicular to wire-feeding direction of the network cable 300. By means of using a matching punch down block 2, the punch down tool 100 accurately punches the core wires 301 of the network cable 300 into the jack 500 and cuts off the unnecessary parts of the core wires 301.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A punch down tool, comprising:

a handle unit comprising a grip and a trigger, said grip comprising hook means extended from a top end thereof, said trigger being pivotally connected to said grip, said trigger comprising a pressure face and a slide shaft, the pressure face and the slide shaft being disposed at a top end of the trigger; and a punch down block detachably mounted at the top end of said handle unit, said punch down block comprising a carrier, a cutter block and a slide block, said carrier being detachably attached to the top end of said grip, said carrier comprising an opening located on a bottom wall thereof and extended to one end of the carrier, and said carrier also comprising a pair of slide rails bilaterally disposed above said opening, said cutter block being detachably mounted in said carrier and fastened to said hook means of said grip to secure said carrier to said grip, said cutter block comprising a plurality of punch-down elements and at least one cutter blade, said slide block being coupled to said slide rails of said carrier and movable along said slide rails relative to said cutter block, said slide block comprising opposing front and rear ends and a receptacle defined in said front end and adapted for holding a jack, the rear end of said slide block being coupled to the pressure face and slide shaft of said trigger in such a manner that biasing said trigger relative to said grip causes movement of said slide block toward said cutter block, enabling core wires of a network cable to be punched, by said punch-down elements, into a jack loaded in said receptacle and enabling the core wires to be cut off by said at least one cutter blade.

2. The punch down tool as claimed in claim 1, wherein said grip comprises an opening; said trigger is inserted through the opening of said grip and pivotally coupled to said grip with a pivot.

3. The punch down tool as claimed in claim 1, further comprising a substantially arched spring plate set between said grip and said trigger, said arched spring plate comprising a first end affixed to said grip and a second end affixed to said trigger.

4. The punch down tool as claimed in claim 3, wherein said arched spring plate is compressed when a bottom end of said trigger is forced by an external biasing force toward said grip, and wherein said arched spring plate is released to return said trigger when the external biasing force is disappeared.

5. The punch down tool as claimed in claim 1, wherein said cutter block comprises a holder structure located on one side thereof and facing toward said slide block; said punch-down elements are mounted at said holder structure.

6. The punch down tool as claimed in claim 1, wherein said carrier defines a horizontal axis; said slide rails extend in a predetermined direction that defines with said horizontal axis a predetermined contained angle.

* * * * *